(12) United States Patent
Schomerus (10) Patent No.: US 11,573,091 B2
(45) Date of Patent: Feb. 7, 2023

(54) METHOD AND DEVICE FOR DETERMINING THE GEOGRAPHIC POSITION AND ORIENTATION OF A VEHICLE

(71) Applicant: Volkswagen Aktiengesellschaft, Wolfsburg (DE)

(72) Inventor: Volker Patricio Schomerus, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 386 days.

(21) Appl. No.: 16/856,761

(22) Filed: Apr. 23, 2020

(65) Prior Publication Data
US 2020/0340817 A1    Oct. 29, 2020

(30) Foreign Application Priority Data

Apr. 26, 2019    (DE) ..................... 10 2019 206 036.6

(51) Int. Cl.
*G06T 7/12*    (2017.01)
*G01C 21/32*    (2006.01)
*G06T 7/73*    (2017.01)
*B60Q 1/50*    (2006.01)
*B60R 11/04*    (2006.01)
*G05D 1/02*    (2020.01)

(52) U.S. Cl.
CPC .............. *G01C 21/32* (2013.01); *B60Q 1/50* (2013.01); *B60R 11/04* (2013.01); *G05D 1/0251* (2013.01);
(Continued)

(58) Field of Classification Search
CPC . G06T 2207/10028; G06T 2207/30244; G06T 2207/30256; G06T 2207/10004;
(Continued)

(56) References Cited

U.S. PATENT DOCUMENTS 9,464,894 B2    10/2016 Napier et al.
9,989,969 B2    6/2018 Eustice et al.
(Continued)

FOREIGN PATENT DOCUMENTS

DE    102018105417 A1    6/2018    ............ G01C 21/04
KR    10-1880185 B1 *    7/2018
(Continued)

OTHER PUBLICATIONS

Haohao Hu et al: "Accurate Global Trajectory Alignment using Poles and Road Markings", Arxiv.org, Cornell University Library, 201 Olin Library Cornell University Ithaca, NY 14853, (Mar. 25, 2019) (Year: 2019).*
(Continued)

*Primary Examiner* — Ian L Lemieux
(74) *Attorney, Agent, or Firm* — Slayden Grubert Beard PLLC (57) ABSTRACT

In a method for determining the geographic position and orientation of a vehicle, an image of the vehicle's surroundings is recorded by at least one camera of the vehicle, wherein the recorded image at least partially comprises regions of the vehicle's surroundings on the ground level. Classification information is generated for the individual pixels of the recorded image and indicates an assignment to one of several given object classes, wherein based on this assignment, a semantic segmentation of the image is performed. Ground texture transitions based on the semantic segmentation of the image are detected. The detected ground texture transitions are projected onto the ground level of the vehicle's surroundings. The deviation between the ground texture transitions projected onto the ground level of the vehicle's surroundings and ground texture transitions in a global reference map is minimized. The current position and
(Continued)

orientation of the vehicle in space is output based on the minimized deviation.

20 Claims, 6 Drawing Sheets

(52) U.S. Cl.
CPC ......... *G05D 1/0253* (2013.01); *G05D 1/0278* (2013.01); *G06T 7/12* (2017.01); *G06T 7/74* (2017.01); *B60Q 2400/50* (2013.01); *B60R 2300/607* (2013.01); *G06T 2207/20084* (2013.01)

(58) Field of Classification Search
CPC ... G06T 2207/10016; G06T 7/74; G06T 7/75; G06T 7/11; G06T 7/12; G06T 7/248; G06T 2207/10024; G06T 2207/20072; G06T 2207/20076; G06T 2207/20081; G06T 2207/20084; G06T 2207/30248; G06T 2207/30252; G05D 1/0274; G05D 1/0278; G05D 1/0251; G05D 1/0246; G06V 20/56; G06V 20/588
See application file for complete search history.

(56) References Cited

U.S. PATENT DOCUMENTS

| | | | |
|---|---|---|---|
| 10,176,596 B1* | 1/2019 | Mou | G01S 17/89 |
| 10,430,968 B2 | 10/2019 | Houts et al. | |
| 2008/0123994 A1* | 5/2008 | Schultz | G06T 3/0031 |
| | | | 382/284 |
| 2017/0248963 A1 | 8/2017 | Levinson et al. | |
| 2017/0277197 A1* | 9/2017 | Liao | G06T 7/55 |
| 2018/0136644 A1 | 5/2018 | Levinson et al. | |
| 2018/0225529 A1* | 8/2018 | Stein | G06T 7/248 |
| 2019/0347808 A1* | 11/2019 | Wong | G06T 7/248 |
| 2020/0098135 A1* | 3/2020 | Ganjineh | G06T 7/74 |
| 2021/0150836 A1* | 5/2021 | Fricke | B60R 25/245 |

FOREIGN PATENT DOCUMENTS

| | | | | |
|---|---|---|---|---|
| WO | 2018/104563 A2 | 6/2018 | ............ | C01C 21/32 |
| WO | 2018/140701 A1 | 8/2018 | ............ | G01C 11/02 |

OTHER PUBLICATIONS

Schomerus, Volker et al., "Camera-Based Lane Border Detection in Arbitrarily Structured Environments," 2014 IEEE Intelligent Vehicles Symposium Proceedings, pp. 56-63, Jun. 8, 2014.
Schomerus, V.P., "Context-Supported Lane Estimation, Understanding the Scene by Learning Spatial Relations Between Semantic Features and Virtual Ground Truth" Dissertation, Technische Universität Carolo-Wilhelmina zu Braunschweig, 126 pages, 2016.
Boschenriedter, Stefan et al., "Multi-Session Virtual Roadway Mapping," 21$^{st}$ International Conference on Intelligent Transportation Systems, pp. 394-400, Nov. 4, 2018.
German Office Action, Application No. 102019206036.6, 6 pages, dated Mar. 16, 2020.

* cited by examiner

METHOD AND DEVICE FOR DETERMINING THE GEOGRAPHIC POSITION AND ORIENTATION OF A VEHICLE

CROSS-REFERENCE TO RELATED APPLICATIONS

This application claims priority to German Patent Application No. DE 10 2019 206 036.6, filed on Apr. 26, 2019 with the German Patent and Trademark Office. The contents of the aforesaid Patent Applications are incorporated herein for all purposes.

TECHNICAL FIELD

The present invention relates to a method for determining the geographic position and orientation of a vehicle which for example can be used for the self-locating of vehicles that are driving autonomously or partially autonomously. The present invention moreover relates to a device for performing the method and a vehicle that is configured to execute such a method or has such a device.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Precise and robust self-locating is one of the prerequisites for vehicles to autonomously drive in road traffic. Global satellite navigation systems such as for example the GPS system are common for positioning and navigating in the automotive field. In addition to the difficulties under conditions of poor reception such as in urban regions or in strong snowfall, the precision is also insufficient for safety-relevant applications.

The precision of GPS-based locating can in fact be significantly improved by methods such as DGPS in which correction signals are normally transmitted to the DGPS receiver by radio. Nonetheless, this also does not enable safe autonomous driving. Accordingly on the one hand, radio-based systems can fail from radio interference, or cannot be evaluated due to encryption by the operator which may even be unannounced, so that reliable position measurement with sufficient precision is then impossible.

Moreover with satellite-assisted positioning, there is no information on the alignment, or respectively orientation of the vehicle, at least without the addition of further sensor data. This can only be calculated indirectly by differentiating from past sequential positions.

In order to also determine the orientation of the vehicle when positioning, various solutions are known in which the vehicle's surroundings are recorded by sensors, for example using a camera or lidar sensor (abbreviation for light detection and ranging).

Accordingly, a 2D coordinate on the map level, and also the orientation of vehicle on this level, can be ascertained by means of camera-based locating using certain landmarks that are entered in a digital map and are detected in the camera image. However, this requires that a sufficient number of suitable landmarks must be entered in the digital map which can also be detected in all weather in any season.

There are also approaches for lidar-based locating. Independent of the light conditions in the vehicle's surroundings, lidar sensors supply a cluster of points with centimeter-precise 3D spatial coordinates for the recorded objects. In conjunction with a digital map consisting of 3D points, these measuring points can be used for positioning. For locating the vehicle, the lidar point cluster currently being measured is matched in the digital map, i.e., brought into correspondence very precisely with the 3D points in the map. However, a disadvantage of such lidar-based locating is that the construction of a precise 3D map required for this is very involved.

Lidar-based locating based on recording landmarks is described in WO 2018/140701 A1. In this case, additional data from a camera is assigned to the 3D points. In US 2017/0248963 A1 and US 2018/0136644 A1, data from different sensors are collected centrally in order to perform route planning for autonomously driving vehicles. In doing so, a localizer is also used that analyzes the data from the various sensors and determines the pose of an autonomous vehicle by comparing the sensor data with map data.

Moreover, WO 2018/104563 A2 discloses recording the vehicle's surroundings using one or more cameras in order to determine the position and orientation of a vehicle. In order to find regions in which landmarks are located that can be used for locating by being compared with a reference map, a semantic segmentation is performed in this case of the images recorded by the cameras. In doing so, 3D landmarks are generated for object classes such as for example buildings or traffic signs in conjunction with depth measurement. Tracking such landmarks over several frames is also proposed.

SUMMARY

An object of the invention is to provide an improved method and an improved device for determining the geographic position and orientation of a vehicle.

The object is achieved by a method and by a corresponding device according to the independent claims. Embodiments of the invention are the discussed in the dependent claims and the following description.

In a first exemplary aspect, a method for determining the geographic position and orientation of a vehicle is provided, the method comprising:
recording an image of the vehicle's surroundings with at least one camera of the vehicle, wherein the recorded image at least partially comprises regions of the vehicle's surroundings on the ground level;
generating classification information for the individual pixels of the recorded image that indicates an assignment to one of several given object classes, and a semantic segmentation of the image is carried out based on this assignment;
detecting ground texture transitions based on the semantic segmentation of the image;
projecting the detected ground texture transitions onto the ground level of the vehicle's surroundings;
minimizing the deviation between the ground texture transitions projected onto the ground level of the vehicle's surroundings and the ground texture transitions in a global reference map; and
outputting, based on the minimized deviation, the current position and orientation of the vehicle in space.

In another exemplary aspect, a device for determining the geographic position and orientation of a vehicle is provided, which device comprises at least one camera for detecting an image of the vehicle's surroundings, wherein the at least one camera can be arranged in a vehicle such that the recorded image at least partially comprises regions of the vehicle's surroundings on the ground level, and a processing unit that:
generates classification information for the individual pixels of the recorded image and indicates an assignment to one of several given object classes and, based on this assignment, performs a semantic segmentation of the image;
detects ground texture transitions based on the semantic segmentation of the image;
projects the detected ground texture transitions onto the ground level of the vehicle's surroundings;
minimizes the deviation between the ground texture transitions projected onto the ground level of the vehicle's surroundings and ground texture transitions in a global reference map; and
outputs the current position and orientation of the vehicle in space based on the minimized deviation.

The details of one or more embodiments are set forth in the accompanying drawings and the description below. Other features will be apparent from the description, drawings, and from the claims.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, a method is provided for determining the geographic position and orientation of a vehicle, wherein:
an image of the vehicle's surroundings is recorded by at least one camera of the vehicle, wherein the recorded image at least partially comprises regions of the vehicle's surroundings on the ground level;
classification information is generated for the individual pixels of the recorded image and indicates an assignment to one of several given object classes, wherein based on this assignment, semantic segmentation of the image is carried out;
ground texture transitions based on the semantic segmentation of the image are detected;
the detected ground texture transitions are projected onto the ground level of the vehicle's surroundings;
the deviation between the ground texture transitions projected onto the ground level of the vehicle's surroundings and the ground texture transitions in a global reference map is minimized; and
based on the minimized deviation, the current position and orientation of the vehicle in space is output.

In this manner, 6D locating, i.e., determination of the 6 degrees of freedom (6DoF) in three-dimensional space may be performed with little effort. Both the current spatial coordinates as well as left, or respectively right rotation (yaw), lateral tilting (rolling), or tilting forward, or respectively backward (pitching) are recorded for the vehicle. Because exclusively ground texture transitions are used for 6D locating and depth information is therefore not required, it is unnecessary to record or track landmarks using 3D positions. Moreover, the utilized reference map does not have to contain any 3D information for the landmarks. Consequently the requirements with respect to computing time and required storage are significantly reduced in comparison to known methods.

In some embodiments, initial transformation parameters between the detected ground texture transitions and the ground texture transitions for the estimated position and orientation in the global reference map may be determined based on an estimation of the current position and orientation of the vehicle, and/or an initial calibration of the at least one camera.

Based on the transformation parameters, the detected ground texture transitions may be projected onto the ground level of the vehicle's surroundings.

To accomplish this, a degree of optimization may be calculated for the deviation and compared with a threshold for an acceptable deviation. The transformation parameters are modified if the threshold value is not undershot, and this process is continued iteratively until the threshold value is undershot.

In these embodiments, a subsection from the global reference map with ground texture transitions may be selected based on the estimation of the current position and orientation of the vehicle and/or the initial calibration of the at least one camera, and the deviation is minimized between the ground texture transitions projected onto the ground level of the vehicle's surroundings and ground texture transitions in the selected subsection of the global reference map.

In this case, the estimation of the current position may be conducted by means of satellite navigation, and the orientation of the vehicle may be ascertained by means of an electronic compass.

Instead or in addition, the estimation of the current position and orientation of the vehicle may be conducted by means of odometric measuring procedures based on a known, previous position and orientation of the vehicle.

In this case, the ground texture transitions may be founded in particular on a different configuration or quality of the surface of different regions of the vehicle's surroundings on the ground level.

Moreover, the global reference map beneficially reproduces a generalized representation of roads and geographic details bordering roads from a bird's-eye perspective.

In some embodiments, the generalized representation is configured in the form of a distance map which indicates the distance to the closest point of a second object class for each point of the reference map of a first object class.

In some embodiments, several different types of ground texture transitions may be provided depending on the object classes of the adjacent regions of the vehicle's surroundings, wherein the deviation between the ground texture transitions projected onto the ground level of the vehicle's surroundings and the ground texture transitions in the global reference map is minimized separately for each of the various types of ground texture transitions, and the arising results are combined to ascertain the parameters for the current position and orientation of the vehicle.

In some embodiments, height information may additionally be recorded by sensors in the region of the ground texture transitions for the pixels of the image recorded by the at least one camera, wherein height information also exists for the individual points of the global reference map, and wherein the pixels of the recorded image and the points of the global reference map are brought into correspondence with each other as best as possible.

In some embodiments, the classification information for the individual pixels may be generated in this case with an artificial neural network.

Correspondingly and according to a second exemplary aspect, a device for determining the geographic position and orientation of a vehicle comprises at least one camera for recording an image in the surroundings of the vehicle, wherein the at least one camera can be arranged in a vehicle such that the recorded image at least partially comprises regions of the vehicle's surroundings on the ground level, and a processing unit that:
- generates classification information for the individual pixels of the recorded image and indicates an assignment to one of several given object classes and, based on this assignment, performs a semantic segmentation of the image;
- detects ground texture transitions based on the semantic segmentation of the image;
- projects the detected ground texture transitions onto the ground level of the vehicle's surroundings;
- minimizes the deviation between the ground texture transitions projected onto the ground level of the vehicle's surroundings and ground texture transitions in a global reference map; and
- outputs the current position and orientation of the vehicle in space based on the minimized deviation.

In some embodiments, a 3D sensor is provided in this case which additionally generates height information in the region of the ground texture transitions for the pixels of the image recorded with the at least one camera.

In these embodiments, the 3D sensor may be configured as a lidar sensor.

The present invention furthermore relates to a motor vehicle in which a method according to the first aspect, and/or the device according to the second aspect, is used.

Other features of the present invention will become apparent from the following description and the claims in conjunction with the FIGS.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIG. 1*t* is further noted that the FIGS. are schematic and provided for guidance to the skilled reader and are not necessarily drawn to scale. Rather, the various drawing scales, aspect ratios, and numbers of components shown in the figures may be purposely distorted to make certain features or relationships easier to understand.

It should be understood that the invention is not limited to these embodiments and that the features described may also be combined or modified without departing from the scope of protection of the invention as defined in the claims.

Figure 1:
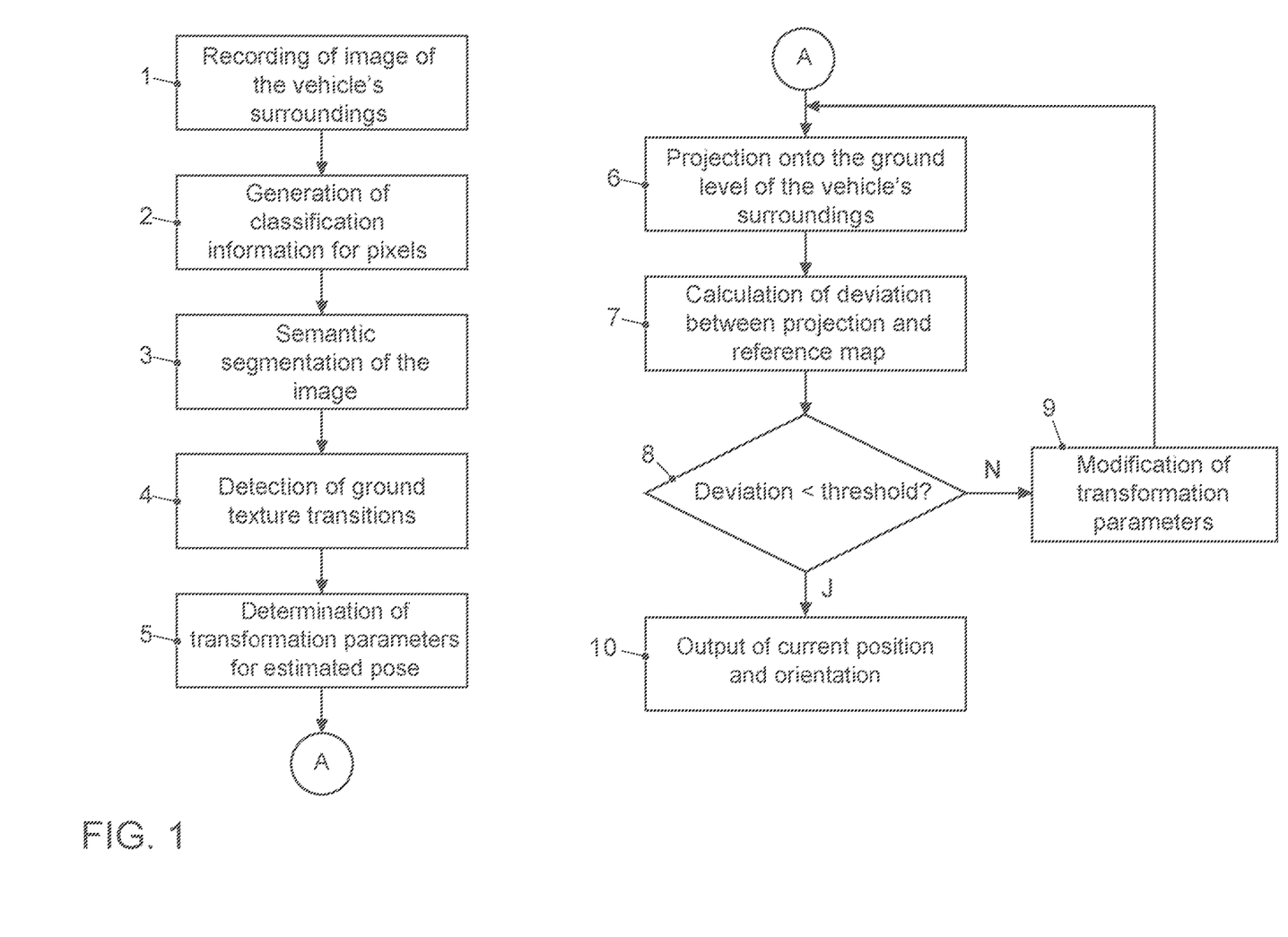
FIG. 1 schematically shows a flowchart of a method.

FIG. 1 schematically shows a flowchart of an exemplary method for determining the geographic position and orientation of a vehicle which in particular can be used for the self-locating of vehicles driving anonymously or partially autonomously. The following explanations refer in this case to an individual image; normally, it is however part of an image sequence, or respectively video sequence.

In method step 1, an image is first recorded with a plurality of pixels using an image sensor that can be integrated in a camera. In this case, the image may in particular exist as a colored image, for example as an RGB signal in which color values exist for the individual pixels for the three primary colors, red, green and blue. Likewise, the image may exist as a gray value image, wherein one gray value exists for each of the individual pixels. In particular visible light, or infrared light instead, or in addition as well, may be recorded by the image sensor in this case. The pixels in this case are assigned to an image sensor, or respectively a camera coordinate system, by the alignment of the image sensor, or respectively the camera.

In the following method step 2, classification information for each pixel is generated by means of a neural network and indicates an assignment to one of several given object classes. The neural network 12 may in particular be a so-called "convolutional neural network" in this case in which the neurons are arranged in one or more "convolutional layers", and the activity of the neurons is calculated by a discrete convolution. Normally, the convolutional layer in this case is followed by a "pooling layer" in which excess information is rejected.

Based thereupon, in the method step 3 the recorded image is divided into various segments such as for example regions of the object classes "roadway", "automobile", "pedestrian", "traffic sign", building", "green verge", or "sky" by semantic segmenting, so-called "semantic pixel labeling". Since semantic pixel labeling is frequently also used in other modules of automatic driving, the result may be jointly used both for pose determining according to the present aspect as well as for the noted other models; consequently, only slightly more computing effort results.

In method step 4, the segments are ascertained that are located on the ground level such as for example roadway surfaces, adjacent edge surfaces such as parking spaces, sidewalks/pathways or green areas, lane markers for example to delimit several lanes from each other or to identify pedestrian crossings, curbs for delimiting various areas of the road from each other and to reinforce green verges and the roadway edge or wayside, or road gullies for street drainage. Texture transitions, i.e., transitions to other object classes on the ground level are then ascertained for these segments. Accordingly for example, the pixels are ascertained which are located at the border between a curb segment and a roadway segment. All dynamic objects and static objects that are not located on the ground level which would therefore distort a projection of the camera image onto the ground level are not used for matching.

Starting from an estimation of the current position and orientation of the vehicle and an initial calibration of the image sensor, or respectively the camera, initial transformation parameters for a transformation $^cT_G$ based on rotation and translation are then determined in method step 5, by means of which the detected ground texture transitions and ground texture transitions for the estimated position and orientation in a global reference map can be approximately converged. In this case, the transformation parameters can in particular be represented by the three Cartesian (translatory) coordinates which describe the position in 3D space on the X, Y and Z axis of a coordinate system, and the three rotary parameters that indicate the rotational angle (orientation) around these axes. To convert coordinates between different coordinate systems, the translatory parameters are typically represented as 3D vectors, and the orientation parameters are represented as a 3×3 rotation matrix.

With this initial estimation for the transformation $^cT_G$ within the global reference map, the detected ground texture transitions from the camera image are projected onto the ground level in the subsequent method step 6.

Then in method step 7, the deviation is calculated between the ground texture transitions projected onto the ground level of the vehicle's surroundings and ground texture transitions in the global reference map, and compared in method step 8 with a predefined threshold value for the necessary quality of correspondence. If this threshold value is already undershot, the current 3D position and the orientation about the three spatial axes is output in method step 10 for further processing steps, in particular for an autonomous driving function.

In most of the cases, the original image is however not yet precise enough to satisfy a degree of optimization predefined for this. In these cases, the projection is then again carried out in an iterative process for modified transformation parameters, and the resulting deviation for this corrected projection is calculated, which is then again compared with the threshold value. This process is continued iteratively until the threshold value is undershot. In this case starting from an initial estimation for the transformation $^cT_G$ corresponding to a rough initial localization and calibration, the transformation $^cT_G$ is corrected, and the error for the current position and orientation of the vehicle is thereby minimized.

Figure 2:
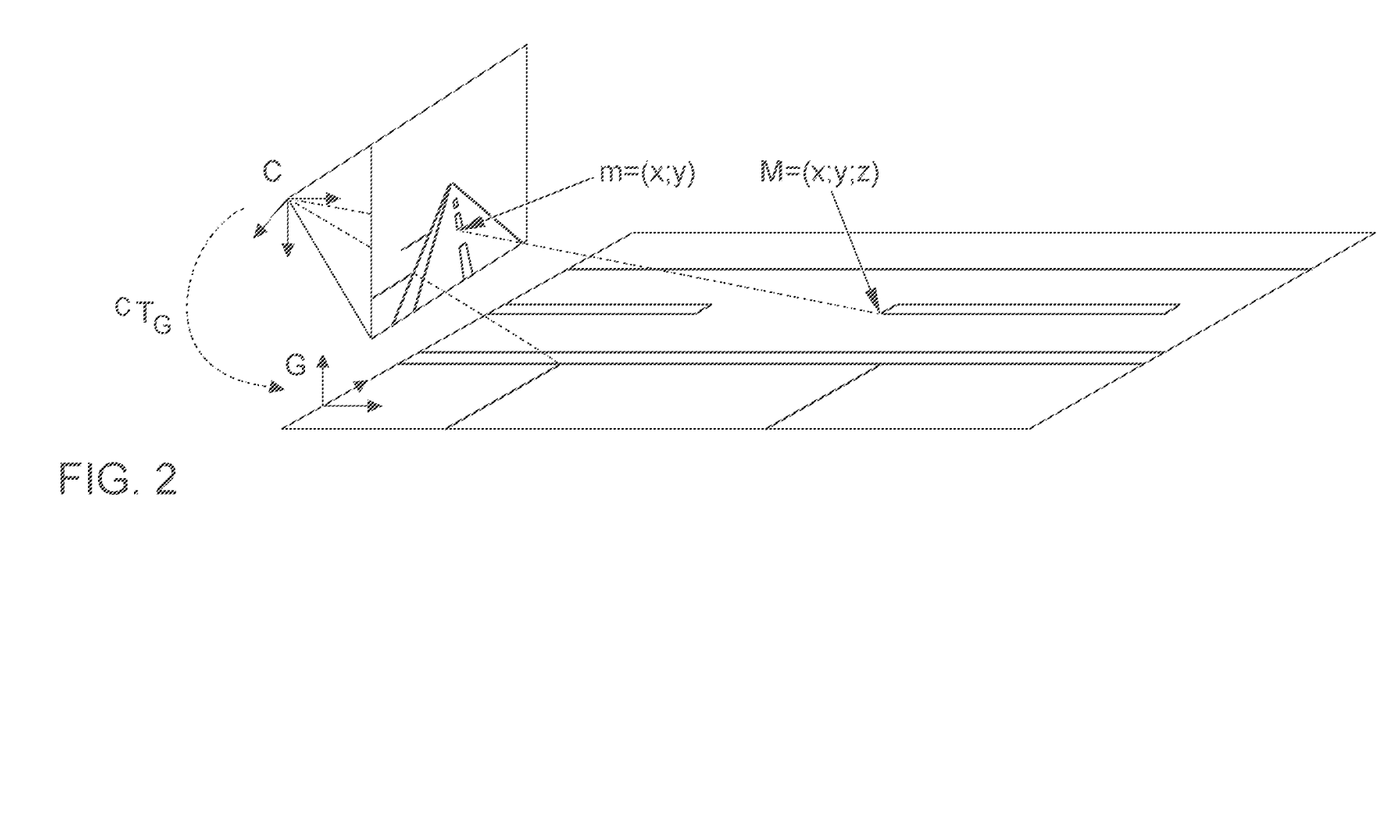
FIG. 2 schematically shows an example of the projection of camera pixels onto the ground level based on the camera calibration parameters and the estimated vehicle pose.

The projection of the camera pixels which belong to a ground texture transition is depicted in FIG. 2. In a known camera pose, i.e., known transformation $^cT_G$ between camera coordinate system C and ground coordinate system G, the projection M of the camera pixel m onto the ground level results as an intersection between the line of sight of the camera and the ground level.

There are various options for minimizing the mismatch and ascertaining the best set of transformation parameters. Accordingly within certain limits, random parameter values can be selected, and they can be arbitrarily varied within the context of iteration, and then the parameter set with the smallest error can be output. Likewise, a cost function can be defined and minimized, for example by using a "gradient descent" optimization algorithm that converges toward a minimum cost function by iterative changes in the parameters.

Furthermore by means of an artificial neural network, the transformation, or respectively nomography between the recorded ground texture transitions and the ground texture transitions drawn from an annotated reference map with the lowest deviations can also be calculated.

In doing so, the optimization can also be initially performed individually for each transition type and then combined.

For example, the deviation of the recorded ground texture transitions from a distance map can be ascertained as a degree of optimization for the region of road just traveled. To accomplish this, reference maps must be generated beforehand from a bird's eye perspective, for example by a service provider specializing in the generation of digital maps. This is shown in FIG. 3 in the example of an intersection region.

Figure 3A:
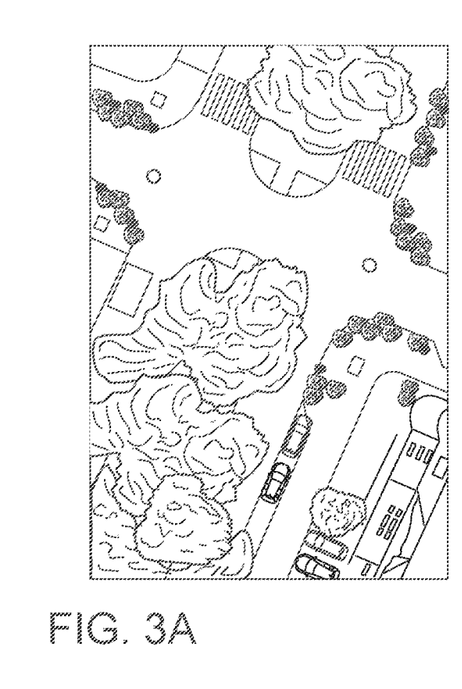
FIGS. 3A-3C schematically show an example of an aerial photograph of an intersection region (A), ground texture transitions for this intersection region (B) and a distance map for this intersection region (C)
Figure 3B:
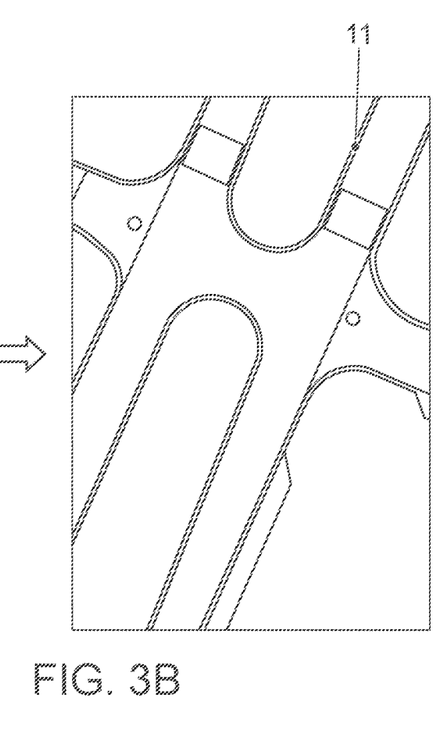

FIG. 3A initially schematically shows an aerial photograph of the intersection region. Ground texture transitions are then ascertained for this aerial photograph on the basis of predefined object classes that are assigned to the ground level. An accentuation 11, as it were a labeling, of the ground texture transitions in the aerial photograph therefore occurs. This is illustrated in FIG. 3B.

Figure 3C:
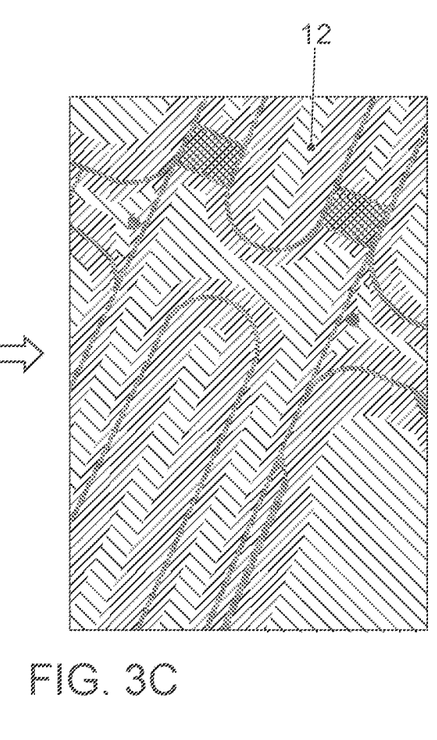

On this basis, a distance map 12 is generated for the intersection region in which the value of each point reproduces the distance to the closest ground texture transition. This is shown in FIG. 3C. Then for example the average distance can be used and minimized as a degree of optimization for the deviation of the recorded ground texture transitions, and can be formed by the sum of the squares of the distances.

These offline generated map data shown in FIG. 3 are then compared with the ground texture transitions detected by the vehicle. To accomplish this, they first need to be generated from the image taken with a camera of the vehicle. This is illustrated in FIG. 4, again using the example of the intersection region already considered beforehand.

Figure 4A:
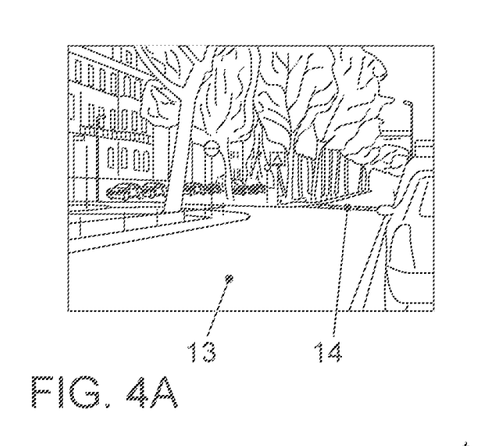
FIGS. 4A-4D schematically show an image of an intersection region (A) taken with a camera, the assignment of the pixels of this image to one of several object classes (B), the projection of the classified pixels onto the ground level (C) with the resulting ground texture transitions (D)

FIG. 4A initially schematically shows an image of the intersection region taken with the camera. In this case, the roadway 13 lying in front of the subject vehicle with a crossroad located at a distance can clearly be seen. On the left next to the roadway are green strips with trees; on the right edge of the roadway, the asphalt transitions into pavement. A pedestrian crossing 14 lying in front of the vehicle, parked vehicles on the roadway edge, bicycle riders and street signs can also be discerned.

Figure 4B:
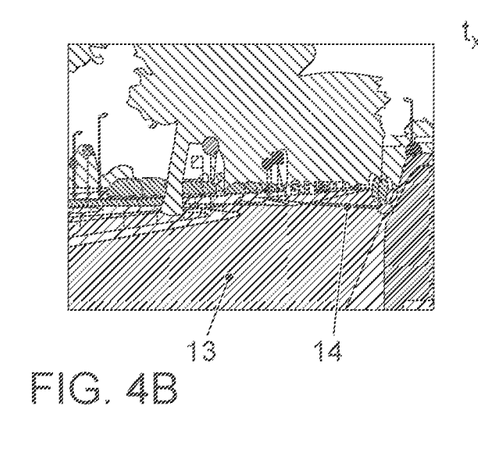

The pixels of this image are then assigned to several different object classes by semantic pixel labeling as illustrated in FIG. 4B. Accordingly, the pixels are assigned to an object class in the region of the drivable asphalt. In the same way, the pixels are assigned to corresponding object classes in the region of the other objects shown in FIG. 4A. In this manner, the image taken with the camera is segmented into different regions, wherein all defined object classes are initially present.

Figure 4C:
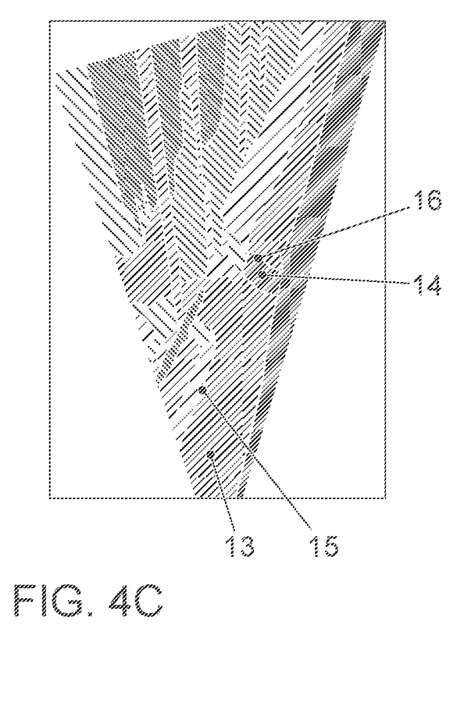
Figure 4D:
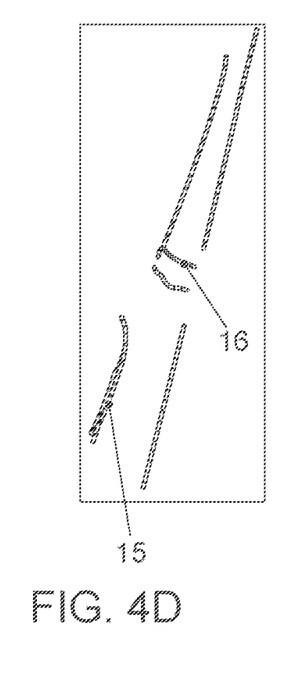

For the segmented image from FIG. 4B, FIG. 4C schematically shows a projection onto the ground level for the sake of illustration. The various segments of the different object classes are still discernible in this case. Such a complete projection for all pixels is however unnecessary for further processing since only the ground texture transitions 15, 16 are relevant to the method according to the present embodiment. These are portrayed in FIG. 4D. In this case, both the progression of the left and right roadway edge 15, as well as the pedestrian crossing 16 can be clearly discerned.

Figure 5A:
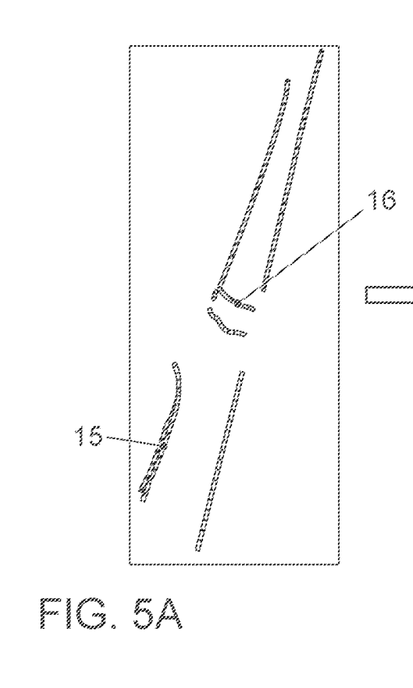
FIGS. 5A-5C again show, for the example from FIG. 3, the ground texture transitions (A) resulting from the projection of the classified pixels onto the ground level, these ground texture transitions in a distance map based on an estimation of the position and orientation of the vehicle (B), as well as the corresponding projection of the ground texture transitions onto the reference map (C)
Figure 5B:
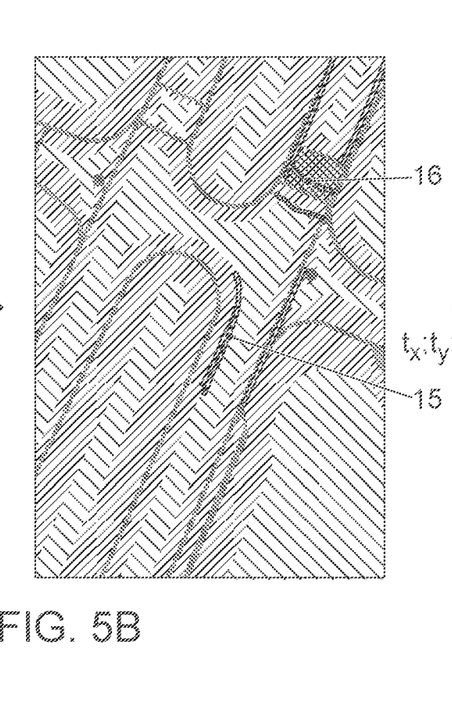
Figure 5C:
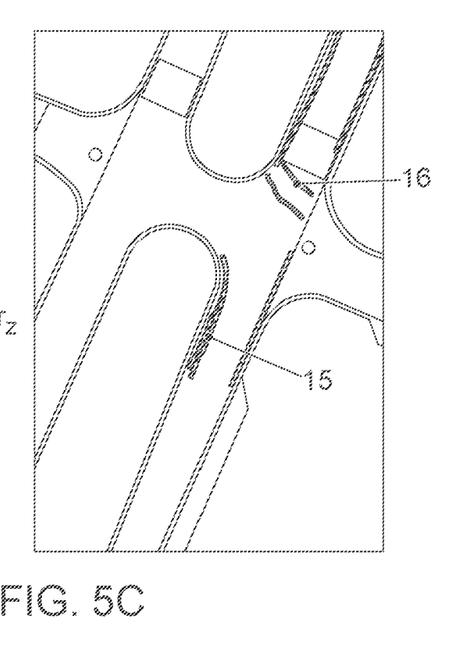

For the example from FIG. 4, FIG. 5A initially again shows the ground texture transitions 15, 16 resulting from the projection of the classified pixels onto the ground level. As shown in FIG. 5B, these are projected for the considered intersection region based on an estimation of the position and orientation of the vehicle in the distance map shown in FIG. 3C. FIG. 5C shows a corresponding projection of the ground texture transitions onto the reference map. In the context of an iterative optimization, the transformation parameters tx, ty, tz, are then adapted for a translation into the three spatial coordinates and rx, ry, rz for a rotation about the three spatial axes until the required quality of correspondence is satisfied.

Figure 6:
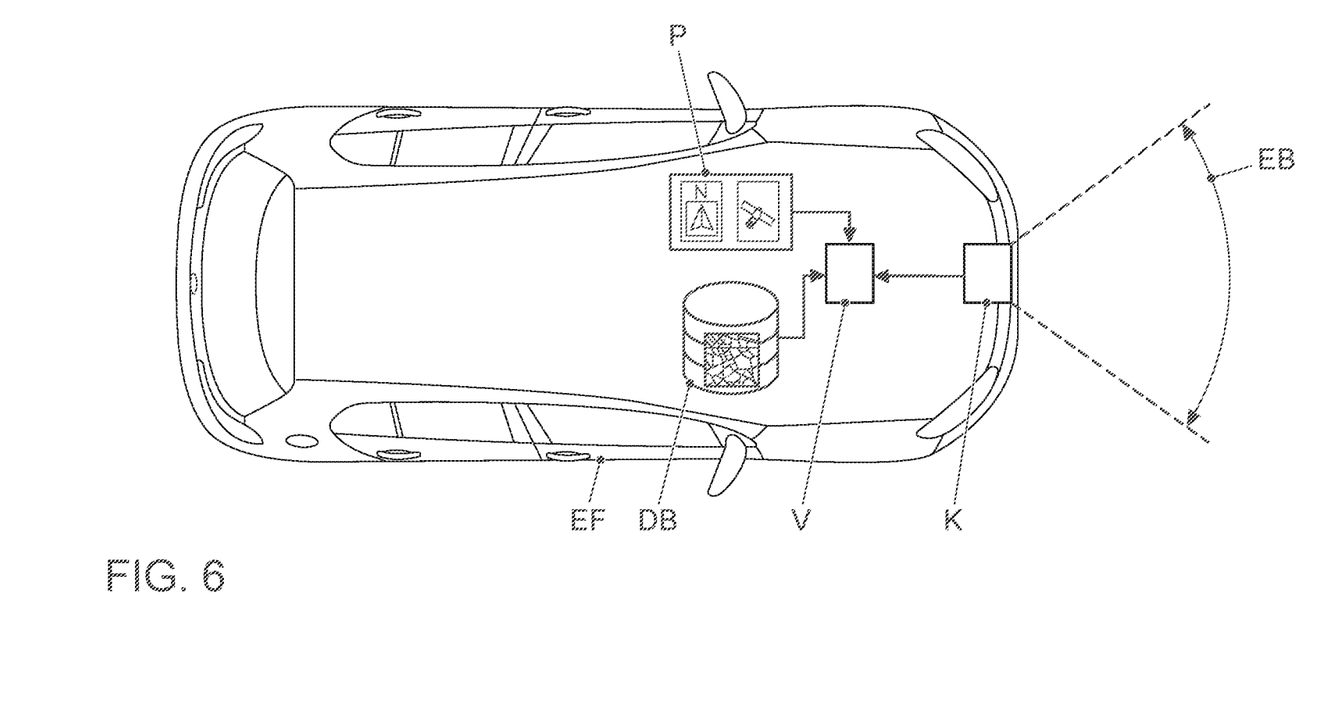
FIG. 6 schematically shows a motor vehicle with a device.

FIG. 6 schematically shows a subject vehicle EF with a device according to an embodiment. The motor vehicle has at least one camera K for recording the vehicle's surroundings lying in front of the vehicle. In this case, the camera can for example be installed in the front grill, but it can also be located at other installation positions that enable unhindered recording of the vehicle's surroundings. In addition, other cameras and/or other types of sensors such as lidar sensors or radar sensors can be provided. In this case, the camera as a front camera has a recording region EB of the vehicle's surroundings located in front of the motor vehicle that for example covers a region of 120° in the horizontal and 90° in the horizontal. In this case, the camera is arranged so that the recorded image at least partially comprises regions of the vehicle's surroundings on the ground level, like in particular the road being traveled by the vehicle.

Several high-resolution RGB images are generated by the camera per second, for example with a resolution within the megapixel range, and sent to a processing unit V. In this, one of several object classes is assigned to each pixel of the RGB image by means of a neural network, and the aforementioned semantic segmentation is carried out in order to detect on this basis the ground texture transitions in the recorded image which are projected onto the ground level.

Furthermore, a pose determining unit P is provided that ascertains, by means of an electronic compass, the approximate current vehicle position from GPS data of a vehicle-internal GPS sensor, and the approximate current orientation of the vehicle, and the information on this is also sent to the processing unit V. Then by means of this information, the processing unit V ascertains a subsection for further processing from a global reference map with ground texture transitions that is present in the database DB. In this case, the database DB can in particular be part of a navigation unit.

The processing unit V then executes an optimization method in order to minimize the deviation between the ground texture transitions projected onto the ground level and the ground texture transitions in the subsection of the global reference map, and based of thereupon, to ascertain the current position and orientation of the vehicle with significantly improved precision in comparison to the estimation, and to use it for further processing steps, or to output it to other processing and actuation units (not shown) for an autonomous driving function, or also to other driver assistance functions.

In addition, a 3D sensor, not shown in the FIG., such as a lidar sensor can be provided which additionally generates height information for the pixels of the image recorded by the camera, which then can be used to further enhance precision.

The methods and devices as described herein may be used for operating automatically driving motor vehicles. Moreover, the methods and devices may for example also be used in other driverless transport systems or mobile robots. However, the invention is not restricted to land vehicles and may also be used for aircraft and watercraft.

LIST OF REFERENCE NUMERALS

1 Recording an image of the vehicle's surroundings
2 Generation of classification information for the individual pixels
3 Semantic segmentation of the image
4 Detection of ground texture transitions
5 Determination of initial transformation parameters for estimated pose
6 Projection onto the ground level of the vehicle's surroundings
7 Calculation of deviation between projection and reference map
8 Query of whether deviation falls below threshold value
9 Modification of transformation parameters
10 Output of current position and orientation
11 Ground texture transitions for aerial photograph
12 Distance map
13 Roadway lying in front of the subject vehicle
14 Pedestrian crossing
15 Projected ground texture transitions of the roadway
16 Projected ground texture transitions of the pedestrian crossing
C Camera coordinate system
G Ground coordinate system
EF Subject vehicle
BF Region of the pixels of the "pedestrian" object class
K Camera
V Processing unit
EB Recording region
DB Database
P Pose determining unit The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for determining the geographic position and orientation of a vehicle, comprising:
   recording an image of the vehicle's surroundings with at least one camera of the vehicle, wherein the recorded image at least partially comprises regions of the vehicle's surroundings on the ground level;
   generating classification information for the individual pixels of the recorded image that indicates an assignment to one of several given object classes, and a semantic segmentation of the image is carried out based on this assignment;
   in response to generating classification information and semantic segmentation, detecting one or more ground texture transitions to pixels of other object classes on the ground level using the semantic segmentation of the image;
   projecting the detected ground texture transitions onto the ground level of the vehicle's surroundings;
   iteratively minimizing a deviation between the ground texture transitions projected onto the ground level of the vehicle's surroundings and ground texture transitions in a global reference map until an acceptable deviation is reached; and only in case the acceptable deviation is reached, outputting the current position and orientation of the vehicle.

2. The method of claim 1, wherein starting from an estimation of the current position and orientation of the vehicle and/or an initial calibration of the at least one camera, initial transformation parameters between the detected ground texture transitions and ground texture transitions for the estimated position and orientation in the global reference map are determined; based on the transformation parameters, the detected ground texture transitions are projected onto the ground level of the vehicle's surroundings; to provide this, a degree of optimization is calculated for the deviation and compared with a threshold value for an acceptable deviation; the transformation parameters are modified if the threshold value is not undershot; and this process is iteratively continued until the threshold value is undershot.

3. The method of claim 2, wherein a subsection from the global reference map with ground texture transitions is selected based on one or more of the estimation of the current position and orientation of the vehicle and the initial calibration of the at least one camera; and the deviation is minimized between the ground texture transitions projected onto the ground level of the vehicle's surroundings and ground texture transitions in the selected subsection of the global reference map.

4. The method of claim 3, wherein the estimation of the current position is conducted on the basis of satellite navigation, and the orientation of the vehicle is ascertained on the basis of an electronic compass.

5. The method of claim 3, wherein the estimation of the current position and orientation of the vehicle is conducted on the basis of odometric measuring procedures based on a known, previous position and orientation of the vehicle.

6. The method of claim 1, wherein the ground texture transitions are based on a different configuration of the surface of different regions of the vehicle's surroundings on the ground level.

7. The method of claim 1, wherein the global reference map reproduces a generalized representation of roads and geographic details bordering roads from a birds-eye perspective.

8. The method of claim 7, wherein the generalized representation is configured in the form of a distance map which indicates the distance to the closest point of a second object class for each point of the reference map of a first object class.

9. The method of claim 1, wherein several different types of ground texture transitions are provided depending on an object class of adjacent regions of the vehicle's surroundings, wherein the deviation between the ground texture transitions projected onto the ground level of the vehicle's surroundings and the ground texture transitions in the global reference map is minimized separately for the different types of ground texture transitions, and the arising results are combined to ascertain the parameters for the current position and orientation of the vehicle.

10. The method of claim 1, wherein height information is additionally recorded by sensors in the region of the ground texture transitions for the pixels of the image recorded by the at least one camera, and height information also exists for the individual points of the global reference map.

11. The method of claim 1, wherein the classification information for the individual pixels is generated by an artificial neural network.

12. A device for determining the geographic position and orientation of a vehicle, with at least one camera for detecting an image of the vehicle's surroundings, wherein the at least one camera can be arranged in a vehicle such that the recorded image at least partially comprises regions of the vehicle's surroundings on the ground level, and a processing unit that:

generates classification information for the individual pixels of the recorded image and indicates an assignment to one of several given object classes and, based on this assignment, performs a semantic segmentation of the image;

in response to generating classification information and semantic segmentation, detects one or more ground texture transitions to pixels of other object classes on the ground level using the semantic segmentation of the image;

projects the detected ground texture transitions onto the ground level of the vehicle's surroundings;

iteratively minimizes a deviation between the ground texture transitions projected onto the ground level of the vehicle's surroundings and ground texture transitions in a global reference map until an acceptable deviation is reached; and only in case the acceptable deviation is reached, outputs the current position and orientation of the vehicle.

13. The device of claim 12, wherein a 3D sensor is provided which additionally generates height information in the region of the ground texture transitions for the pixels of the image recorded with the at least one camera.

14. The device of claim 13, wherein the 3D sensor comprises a lidar sensor.

15. A motor vehicle that is configured for an autonomous or partially autonomous driving function and to execute the method of claim 1.

16. The method of claim 4, wherein the estimation of the current position and orientation of the vehicle is conducted on the basis of odometric measuring procedures based on a known, previous position and orientation of the vehicle.

17. The method of claim 2, wherein the ground texture transitions are based on a different configuration of the surface of different regions of the vehicle's surroundings on the ground level.

18. The method of claim 3, wherein the ground texture transitions are based on a different configuration of the surface of different regions of the vehicle's surroundings on the ground level.

19. The method of claim 4, wherein the ground texture transitions are based on a different configuration of the surface of different regions of the vehicle's surroundings on the ground level.

20. A motor vehicle that is configured for an autonomous or partially autonomous driving function and that has the device of claim 12.

* * * * *